United States Patent
Chang

(10) Patent No.: US 10,319,084 B2
(45) Date of Patent: Jun. 11, 2019

(54) IMAGE PROJECTION SYSTEM AND CALIBRATION METHOD OF PROJECTED IMAGE

(71) Applicant: BJ Tek Corporation, Beijing (CN)

(72) Inventor: Hsiu-Cheng Chang, Taoyuan (TW)

(73) Assignee: BJ Tek Corporation, Beijing (CN)

( * ) Notice: Subject to any disclaimer, the term of this patent is extended or adjusted under 35 U.S.C. 154(b) by 0 days.

(21) Appl. No.: 15/646,178

(22) Filed: Jul. 11, 2017

(65) Prior Publication Data

US 2018/0018760 A1    Jan. 18, 2018

(30) Foreign Application Priority Data

Jul. 14, 2016    (TW) .............................. 105122250 A

(51) Int. Cl.
| | |
|---|---|
| G06T 5/00 | (2006.01) |
| G06T 7/62 | (2017.01) |
| G06T 3/00 | (2006.01) |
| G06T 3/40 | (2006.01) |
| G06T 5/50 | (2006.01) |

(52) U.S. Cl.
CPC .............. G06T 5/006 (2013.01); G06T 3/005 (2013.01); G06T 3/403 (2013.01); G06T 5/50 (2013.01); G06T 7/62 (2017.01); *G06T 2207/20182* (2013.01)

(58) Field of Classification Search
CPC ........... G06T 5/006; G06T 3/403; G06T 7/62; G06T 3/005; G06T 5/50; G06T 2207/20182

See application file for complete search history.

(56) References Cited

U.S. PATENT DOCUMENTS

| | | | | |
|---|---|---|---|---|
| 2003/0210381 | A1* | 11/2003 | Itaki | H04N 5/74 353/70 |
| 2005/0179688 | A1* | 8/2005 | Chernichenko | G06T 5/006 345/427 |
| 2005/0280780 | A1* | 12/2005 | Matsumoto | G06T 5/006 353/70 |

(Continued)

FOREIGN PATENT DOCUMENTS

| | | |
|---|---|---|
| TW | 200515265 | 5/2005 |
| TW | 201338535 | 9/2013 |

*Primary Examiner* — Ming Y Hon
(74) *Attorney, Agent, or Firm* — WPAT, PC

(57) ABSTRACT

The present application provides an image projection system and a calibration method of projected image. The calibration method comprises: displaying an original image data as a first image having a first boundary characteristic; projecting the first image as a projected image; analyzing a difference between a boundary shape of the projected image and the first boundary characteristic which is unadjusted; according to the difference between the boundary shape of the projected image and the unadjusted first boundary characteristic, adjusting the first boundary characteristic until the boundary shape of the projected image is similar to the unadjusted first boundary characteristic; and recording the first boundary characteristic at the time when the boundary shape of the projected image is similar to the unadjusted first boundary characteristic as a second boundary characteristic, wherein the first boundary characteristic is the shape of at least one displaying boundary line around the first image.

4 Claims, 10 Drawing Sheets

(56) References Cited

U.S. PATENT DOCUMENTS

| | | | |
|---|---|---|---|
| 2006/0204136 A1* | 9/2006 | Lee | G06F 3/1446 |
| | | | 382/294 |
| 2006/0291014 A1* | 12/2006 | Hirata | G03B 21/14 |
| | | | 358/504 |
| 2008/0089611 A1* | 4/2008 | McFadyen | G06T 5/006 |
| | | | 382/289 |
| 2010/0014134 A1* | 1/2010 | Cable | G03H 1/2205 |
| | | | 359/9 |
| 2011/0122101 A1* | 5/2011 | Kurozuka | G02B 26/101 |
| | | | 345/204 |
| 2013/0235082 A1* | 9/2013 | Furui | G09G 3/002 |
| | | | 345/647 |
| 2014/0340529 A1* | 11/2014 | Shibata | H04N 9/3185 |
| | | | 348/189 |
| 2015/0015852 A1* | 1/2015 | Furui | H04N 9/3194 |
| | | | 353/69 |
| 2015/0124174 A1* | 5/2015 | Naftali | G02B 26/101 |
| | | | 348/745 |
| 2016/0353068 A1* | 12/2016 | Ishikawa | H04N 9/3147 |
| 2017/0104967 A1* | 4/2017 | Peng | H04N 9/3173 |
| 2017/0345137 A1* | 11/2017 | Nakayama | G06T 5/006 |

* cited by examiner

IMAGE PROJECTION SYSTEM AND CALIBRATION METHOD OF PROJECTED IMAGE

FIELD OF THE INVENTION

The present invention relates to calibration technique for projected images, and more particularly to an image projection system and a calibration method of projected image.

BACKGROUND OF THE INVENTION

Image projection is a technique commonly used nowadays. However, there exists some deformation between original images and projected images generated by projecting the original images. Therefore, image calibration solutions must be provided in the image projection apparatuses to compensate the deformation generated from projecting the images. For example, keystone adjustment which adjusts a projecting angle from the image projection apparatus is provided to calibrate a trapezoid projected image.

In the application of HUD (Head Up Display), the original image is projected and the projected image is formed through using a front cover of safety helmet or a windshield, which is usually a curved surface. However, the projected image would be twistedly deformed because the curved surface is used for forming the projected image, and the twisted deformation generated due to using the curved surface cannot be calibrated by simply applying the keystone adjustment mentioned above. A most common solution for calibrating the twisted deformation is to design a specific optical element group or to adjust parameters of the optical elements. However, once the curvature of the curved surface is changed, a great effort must be done for redesigning the specific optical element group or readjusting the parameters of the optical elements so as to again compensate the deformation. Therefore, there's a need to establish a solution which can easily calibrate the deformation occurred while projecting images.

SUMMARY OF THE INVENTION

The present invention provides an image projection system and a calibration method of projected image. The image projection system calibrates the projected image by adjusting the shape of the image before being projected, so that the cost paid for calibrating deformation of projected images can be reduced since there is no need to use a complex optical compensation structure or to adjust parameters of the optical elements.

In one aspect, the present invention provides a calibration method of projected image, which is suitable for calibrating deformation of the projected image being projected by an image projection apparatus, comprising steps of: displaying an original image data as a first image having a first boundary characteristic; projecting the first image as the projected image by using the image projection apparatus; analyzing a difference between a boundary shape of the projected image and the first boundary characteristic which is unadjusted; adjusting the first boundary characteristic according to the difference between the boundary shape of the projected image and the unadjusted first boundary characteristic until the boundary shape of the projected image is similar to the unadjusted first boundary characteristic; and recording the first boundary characteristic as a second boundary characteristic when the boundary shape of the projected image is similar to the unadjusted first boundary characteristic, wherein the first boundary characteristic is the shape of at least one displaying boundary line around the first image.

In one embodiment, the step of analyzing the difference between the boundary shape of the projected image and the first boundary characteristic which is unadjusted comprises steps of: retrieving at least two original image reference points from a boundary data displayed as the at least one displaying boundary line forming the first boundary characteristic, wherein the boundary data is included in the original image data; setting an expected boundary of an expected projected image to be similar to the unadjusted first boundary characteristic; for each of the at least two original image reference points, estimating a displayed reference point position where a corresponded one of the at least two original image reference points is displayed while displaying the original image data as the first image having the first boundary characteristic; for each of the at least two original image reference points, estimating a projected reference point position in the projected image according to the displayed reference point position, wherein the corresponded one original image reference point is projected onto the projected reference point position; and for each of the at least two original image reference points, estimating a distance between the projected reference point position and the expected boundary, and recording the distance as a reference point shift value corresponding to the projected reference point position.

In one embodiment, the step of adjusting the first boundary characteristic according to the difference between the boundary shape of the projected image and the unadjusted first boundary characteristic until the boundary shape of the projected image is similar to the unadjusted first boundary characteristic comprises steps of: determining whether each of the reference point shift values is not greater than a predetermined value; when each of the reference point shift values is not greater than the predetermined value, determining the boundary shape of the projected image is similar to the unadjusted first boundary characteristic; and when any one of the reference point shift values is greater than the predetermined value, adjusting the first boundary characteristic which exists currently, displaying the original image data as the first image having the first boundary characteristic existed currently, and projecting the first image by the image projection apparatus to obtain the projected image.

In one embodiment, the step of adjusting the first boundary characteristic which exists currently comprises steps of: keeping positions of the original image reference points unchanged while adjusting at least one of the displayed reference point positions such that the adjusted displayed reference point position is closer to the expected boundary than before; selecting every two neighbored displayed reference point positions as a parameter for performing a Cubic Spline algorithm to obtain a Cubic Spline function between the selected two neighbored displayed reference point positions; and setting a set comprising every obtained Cubic Spline function to be the first boundary characteristic existed currently.

In one embodiment, the calibration method further comprises step of: displaying the original image data as a second image having the second boundary characteristic.

In one embodiment, the step of displaying the original image data as the second image having the second boundary characteristic comprises steps of: calculating a first amount of pixels allowed to be displayed in each row between two displaying boundary lines which are opposite and extended along a first direction; calculating a second amount of pixels allowed to be displayed in each column between two displaying boundary lines which are opposite and extended along a second direction different from the first direction; resizing image data in the original image data corresponding to each row between two displaying boundary lines which are opposite and extended along the first direction in accordance with the calculated first amount; and resizing image data in the original image data corresponding to each column between two displaying boundary lines which are opposite and extended along the second direction in accordance with the calculated second amount.

In one embodiment, a boundary of the first image comprises four displaying boundary lines, the four displaying boundary lines form a quadrilateral, and an amount of original image reference point in each of the four displaying boundary lines is not all the same.

In another aspect, the present invention provides an image projection system, which comprises a projected image calibration apparatus, comprising a first image data source, which provides an original image data; a first display apparatus, which is electrically coupled to the first image data source for receiving the original image data, and displays the original image data as a first image having a first boundary characteristic; a first image projection apparatus, which projects the first image as a projected image; an image capturing apparatus, which captures the projected image; and a processor, which is electrically coupled to the first display apparatus and the image capturing apparatus, receives the projected image from the image capturing apparatus, analyzes a difference between a boundary shape of the projected image and the first boundary characteristic which is unadjusted, and adjusts the first boundary characteristic so as to change the boundary shape of the first image according to the difference between the boundary shape of the projected image and the unadjusted first boundary characteristic until the boundary shape of the projected image is similar to the unadjusted first boundary characteristic, wherein the first boundary characteristic currently existed is recorded as a second boundary characteristic when the boundary shape of the projected image is similar to the unadjusted first boundary characteristic.

In one embodiment, the image projection system further comprises a normal image projection apparatus, comprising a second image data source, which provides an image data; a second display apparatus, which is electrically coupled to the second image data source for receiving the image data, and displays the image data as a second image having the second boundary characteristic; and a second image projection apparatus, which projects the second image.

In one embodiment, the first image and the second image are projected to a curved surface which reflects light.

In another aspect, the present invention provides a calibration method of projected image, which is suitable for calibrating deformation of the projected image being projected by an image projection apparatus, comprising steps of: displaying an original image data as a first image; projecting the first image as the projected image; analyzing a difference between a boundary shape of the projected image and a shape of the first image before being adjusted; according to the difference between the boundary shape of the projected image and the shape of the first image before being adjusted, adjusting the shape of the first image without changing the original image data until the boundary shape of the projected image is similar to the shape of the first image before being adjusted; and recording and outputting the shape of the first image existed currently when the boundary shape of the projected image is similar to the shape of the first image before being adjusted.

Accordingly, the image projection system and calibration method of projected image calibrates deformation of the projected image by adjusting the image to be projected, so that the optical elements used for calibration deformation of the projected image are not needed. Therefore, the cost for calibrating images is reduced. Compared with the traditional technique which must adjust parameters of the optical elements used in the projection apparatus when characteristics of the medium where the image is projected (such as the curvature of a surface for projecting the image thereon), the image projection system and calibration method of projected image provided by the present invention can apply the same image calibration solution on the mediums with different characteristics easily to calibrate the deformation. Therefore, the technique solution provided by the present invention is very practical.

DETAILED DESCRIPTION OF PREFERRED EMBODIMENTS

Figure 1:
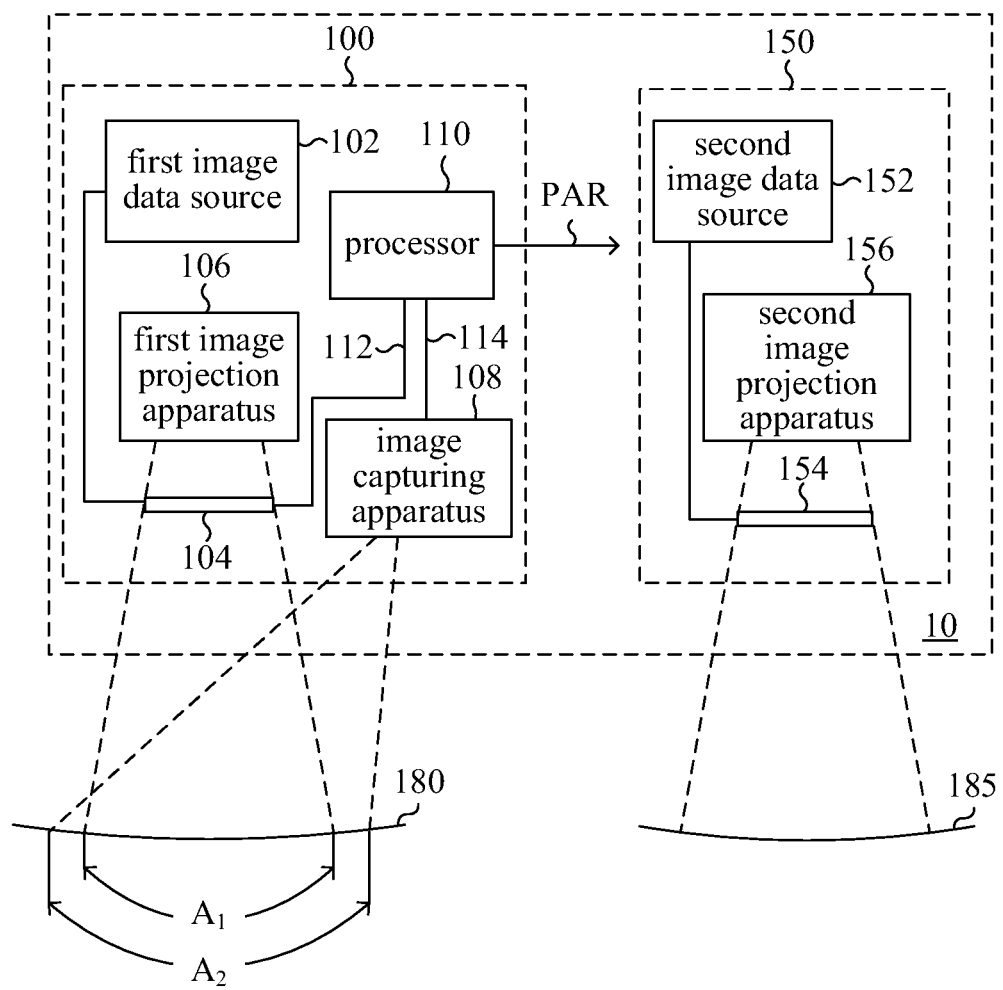
FIG. 1 is a circuit block diagram of an image projection system according to one embodiment of the present invention.

Please refer to FIG. 1, which is a circuit block diagram of an image projection system according to one embodiment of the present invention. In the embodiment, the image projection system 10 comprises a projected image calibration apparatus 100 and a normal image projection apparatus 150. The projected image calibration apparatus 100 comprises a first image data source 102, a first display apparatus 104, a first image projection apparatus 106, an image capturing apparatus 108 and a processor 110. The normal image projection apparatus 150 comprises a second image data source 152, a second display apparatus 154 and a second image projection apparatus 156. The projected image calibration apparatus 100 performs calibration on deformation of the projected image in accordance with the projected image which is projected to an object 180. The normal image projection apparatus 150 performs image projection in accordance with the parameters PAR generated from the projected image calibration apparatus 100 after the calibration on deformation of the projected image is accomplished by the projected image calibration apparatus 100.

In the projected image calibration apparatus 100, the first image data source 102 is electrically coupled to the first display apparatus 104, and the first image data source 102 provides an original image data to the first display apparatus 104. After receiving the original image data from the first image data source 102, the first display apparatus 104 displays the original image data as a first image having a first boundary characteristic. The first image projection apparatus 106 projects the first image to the object 180 to correspondingly form a projected image. The projected image is captured by the image capturing apparatus 108, and the projected image captured by the image capturing apparatus 108 is sent to the processor 110. It is noted that the whole projected image should be captured by the image capturing apparatus 108. Therefore, when the first projection apparatus 106 projects the first image and the projected image can be found at the area $A_1$ of the object 180, the size of an area $A_2$ selected by the image capturing apparatus 108 for capturing the image should be equal to or larger than the size of the area $A_1$. The processor 110 is electrically coupled to the first display apparatus 104 via the signal line 112, and is electrically coupled to the image capturing apparatus 108 via the signal line 114. The processor 110 obtains the captured projected image from the image capturing apparatus 108, analyzes a difference between a boundary shape of the projected image and the first boundary characteristic which is unadjusted, and adjusts the first boundary characteristic to change the boundary shape of the first image according to the difference between the boundary shape of the projected image and the unadjusted first boundary characteristic until the boundary shape of the projected image is similar to the unadjusted first boundary characteristic. When the boundary shape of the projected image is similar to the unadjusted first boundary characteristic, the processor 110 records the first boundary characteristic existed currently as a second boundary characteristic, and outputs the second boundary characteristic to the normal image projection apparatus 150 so that the normal image projection apparatus could perform image projection with the received second boundary characteristic.

In the normal image projection apparatus 150, the second image source 152 provides an image data, and the second display apparatus 154 is electrically coupled to the second image source 152 to receive the image data provided by the image source 152. After receiving the image data provided by the image source 152 and the second boundary characteristic mentioned above, the second display apparatus 154 display the received image data as a second image having the second boundary characteristic. Finally, the second image projection apparatus 156 projects the second image displayed by the second display apparatus 154 to the object 185 so that a projected image could be formed correspondingly.

It is noted that the object 180, to which the projected image calibration apparatus 100 (or the first projection apparatus 106) projects the first image, is preferred to have a shape the same as the object 185, so that the second boundary characteristic obtained by the projected image calibration apparatus 100 can be used directly on the normal image projection apparatus 150 without any adjustment. For example, because the object 185 might be a front cover of a safety helmet or a windshield of a car when one would like to apply the normal image projection apparatus 150 in a HUD (Head Up Display) system, an object with a curved surface being capable of reflecting lights the same as the front cover or the windshield should be used as the object 180 to reduced subsequent need for additional deformation calibrating operations.

Furthermore, although the image projection system 10 consists of one normal image projection apparatus 150 and one projected image calibration apparatus 100, the second boundary characteristic provided by the projected image calibration apparatus 100 can be applied to other normal image projection apparatuses. The amount of the normal image projection apparatus 150 does not affect the implementation of the technique solution provided by the present invention.

Figure 2:
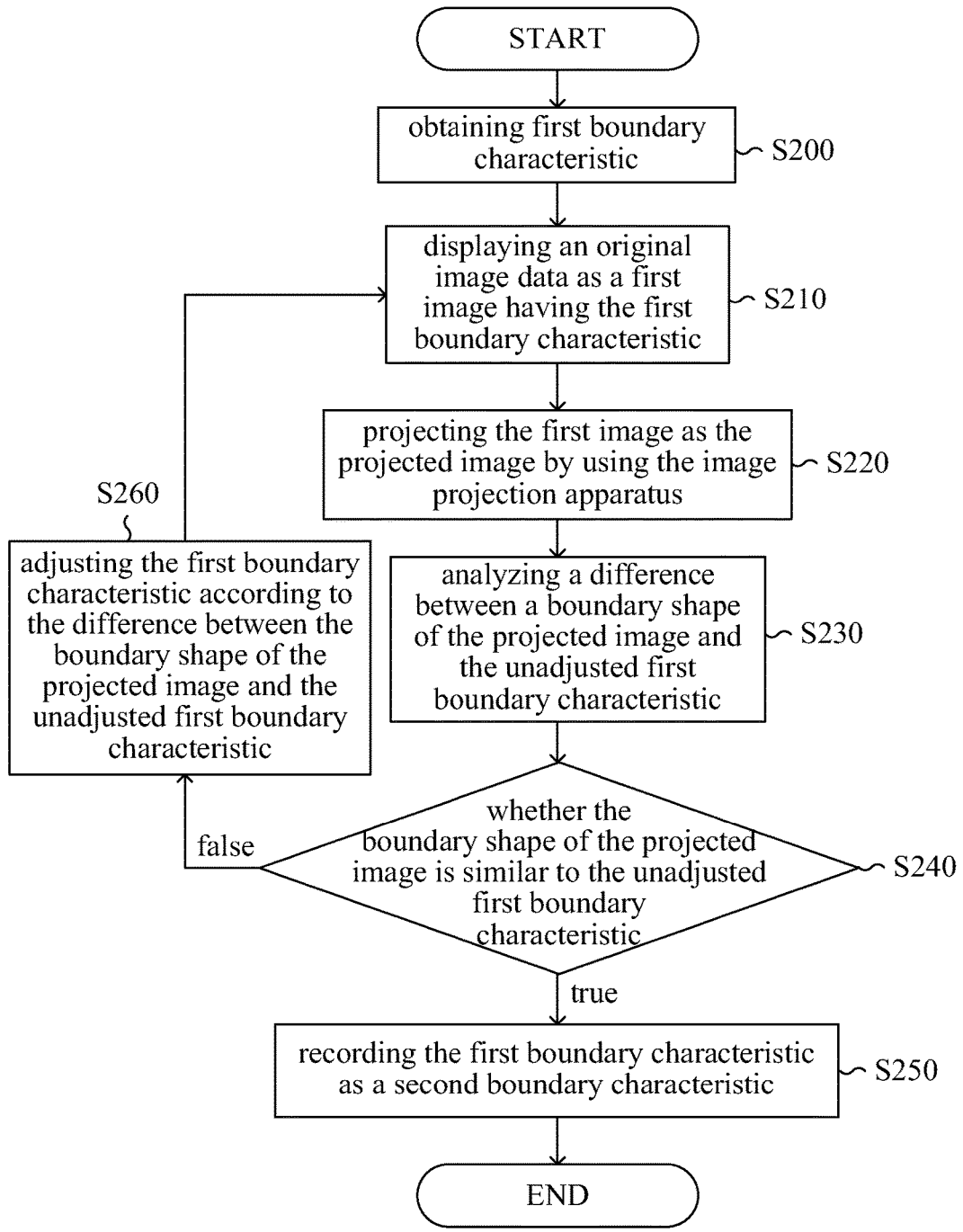
FIG. 2 is a flow chart of a calibration method of projected image according to one embodiment of the present invention.

Please refer to FIG. 2, which is a flow chart of a calibration method of projected image according to one embodiment of the present invention. In this embodiment, the first boundary characteristic is obtained in the beginning (step 200). The first boundary characteristic is the shape of each boundary limiting an image display area where the display apparatus, such as the first display apparatus 104 or the second display apparatus 154, displays an image. Taking a normal square display apparatus as an example, there exists four boundaries of the image display area, which comprise an upper boundary limiting display positions at top of the image display area, a lower boundary limiting display positions at bottom of the image display area, a left boundary limiting display positions at left of the image display area, and a right boundary limiting display positions at right of the image display area. The first boundary characteristic mentioned above can be the shape of one of the four boundaries or combinations of the shapes of at least two of the four boundaries. In the embodiment, any one of the boundaries is referred to as a displaying boundary line. In other words, the upper boundary, the lower boundary, the left boundary and the right boundary are a displaying boundary line, respectively, and the first boundary characteristic comprises the shape of at least one displaying boundary line.

After obtaining the first boundary characteristic, the display apparatus displays an original image data as the first image having the first boundary characteristic existed currently (the first boundary characteristic existed currently at this moment is the first boundary characteristic before being adjusted, or referred to as unadjusted first boundary characteristic) (step 210). After the first image is displayed by the display apparatus, a projection apparatus is used for projecting the first image to generate a projected image correspondingly (step S220). Thereafter, a difference between the boundary shape of the projected image and the unadjusted first boundary characteristic is analyzed (step S230). The calibration method is then branched into different flows according to whether the boundary shape of the projected image is similar to the unadjusted first boundary characteristic (step S240).

Assuming that the boundary shape of the projected image is determined to be similar to the unadjusted first boundary characteristic or, in another aspect, the difference between the boundary shape of the projected image and the unadjusted first boundary characteristic is less than a predetermined threshold, the flow of the calibration method goes to step S250 and the first boundary characteristic existed currently is recorded as a second boundary characteristic. On the contrary, when the boundary shape of the projected image is determined to be not similar to the unadjusted first boundary characteristic or, in another aspect, the difference between the boundary shape of the projected image and the unadjusted first boundary characteristic is greater than or equal to the predetermined threshold, the flow of the calibration method goes to step S260 to adjust the first boundary characteristic in accordance with the difference between the boundary shape of the projected image and the unadjusted first boundary characteristic. The flow goes back to step S210 and operations of step S210, S220, S230 and S240 are performed again after adjustment of the first boundary characteristic is completed. It is noted that, when the step S210 is performed in the first time, the "first boundary characteristic existed currently" used in the step S210 is the one obtained by the step S200 and is unadjusted. In another aspect, when the step S210 is performed after the step S260 is completed, the "first boundary characteristic existed currently" used in the step S210 is the one adjusted by the step S260. Therefore, the boundary shape of the first image generated by performing the step S210 in the first time is different from the boundary shape of the first image generated by performing the step S210 after the step S260 is completed once. Furthermore, because the boundary shape of the first image is different, a corresponded projected image with different boundary shape would be generated by performing the step S220.

It is noted that, the term such as "the first image having the first boundary characteristic" recited in the disclosure means that the shape of the displaying boundary line(s) of the first image is(are) the same as the first boundary shape, but the lengths are not necessary the same. Similarly, the term such as "the projected image is similar to the first boundary characteristic" recited in the disclosure means that the shape of the boundary line(s) of the projected image is(are) the same as the first boundary shape, but the lengths are not necessary the same.

Figure 3:
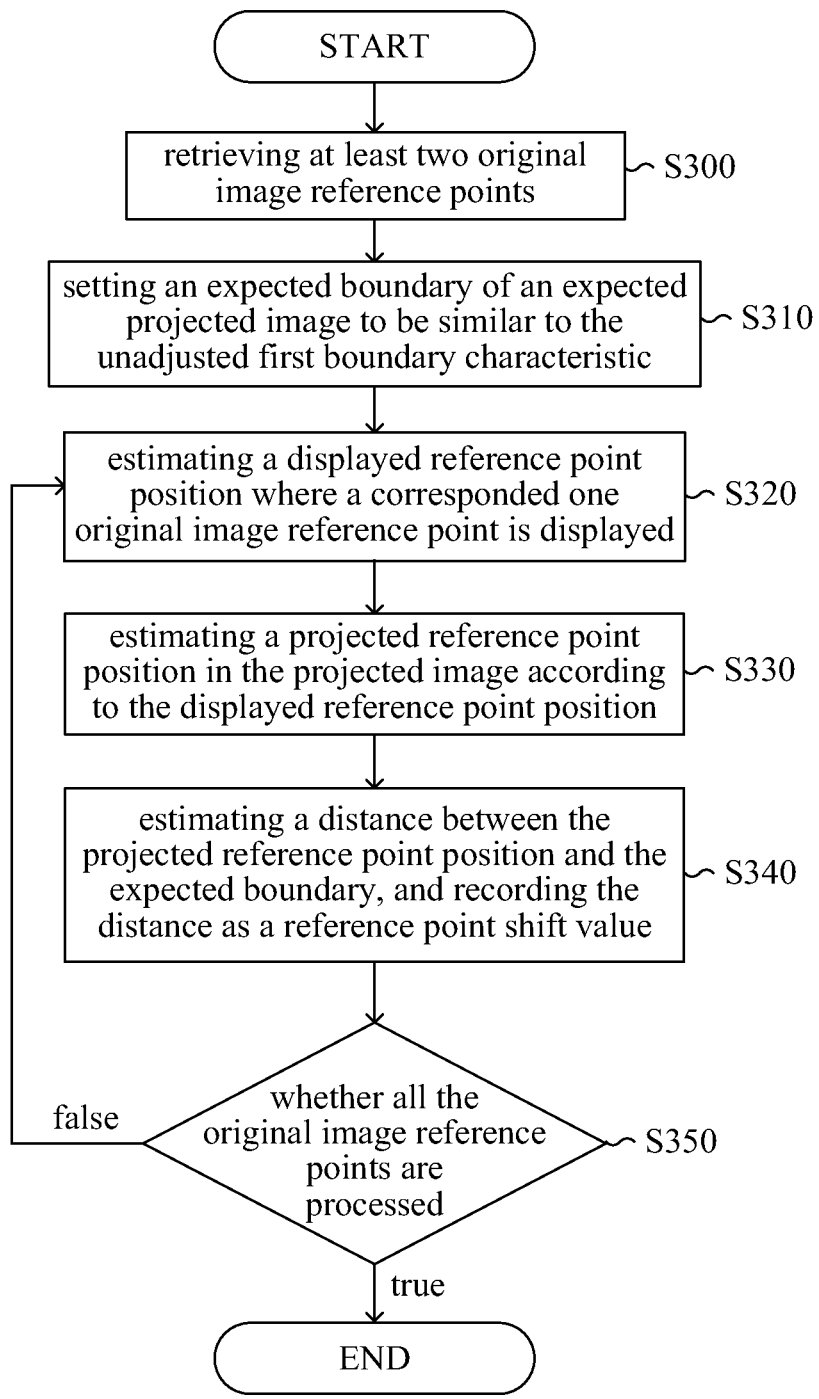
FIG. 3 is a detailed flow chart showing operations performed in the step S230 according to one embodiment of the present invention.

Please refer to FIG. 3, which is a detailed flow chart showing operations performed in the step S230 according to one embodiment of the present invention. In this embodiment, when the projected image is obtained in the step S220 through projecting the first image by the projection apparatus, at least two original image reference points are retrieved from a boundary data which are included in the original image original image data and displayed as at least one displaying boundary line forming the first boundary characteristic (step S300). Furthermore, it is preferred to set an expected projected image of which an expected boundary is similar to the unadjusted first boundary characteristic (step S310) to simplify analysis being made thereafter. It is noted that the step S300 and step S310 are used for preparing data and are not to be performed after the step S230. Furthermore, the sequence of the step S300 and the step S310 is not fixed to the sequence shown in this embodiment. In short, the only limitation is that the step S300 and the step S310 should be performed before the step S320.

After obtaining the original image reference points and the expected projected image, the flow goes to the step S320 to estimate a displayed reference point position where a corresponded one of the original image reference points is displayed while displaying the original image data as the first image having the first boundary characteristic. After estimating the displayed reference point position in the step S320, a projected reference point position onto which the estimated displayed reference point position is projected in the projected image is estimated (step S330). After the projected reference point position is estimated, a distance between the projected reference point position and the expected boundary is estimated and is recorded as a reference point shift value corresponding to the projected reference point position (step S340). After estimating each one of the reference point shift values, the flow goes to the step S350 to determine whether all the original image reference points have been processed under the steps from S320 to S340 or not. When there is any one of the original image reference points not being processed under the steps from S320 to S340, the flow goes back to the step S320 to process the next one of the original image reference points. On the contrary, when all the original image reference points are processed under the steps from S320 to S340, the flow goes to the step S240.

Although all the obtained original image reference points must be processed under the steps from S320 to S340 when repeating the steps S210 to S240 according to FIG. 2 and FIG. 3, it should be noted that when some of the original image reference points are located (will be described later), the located original image reference points are not processed under the steps from S320 to S340 anymore, so that some unnecessary calculations can be saved.

Figure 4:
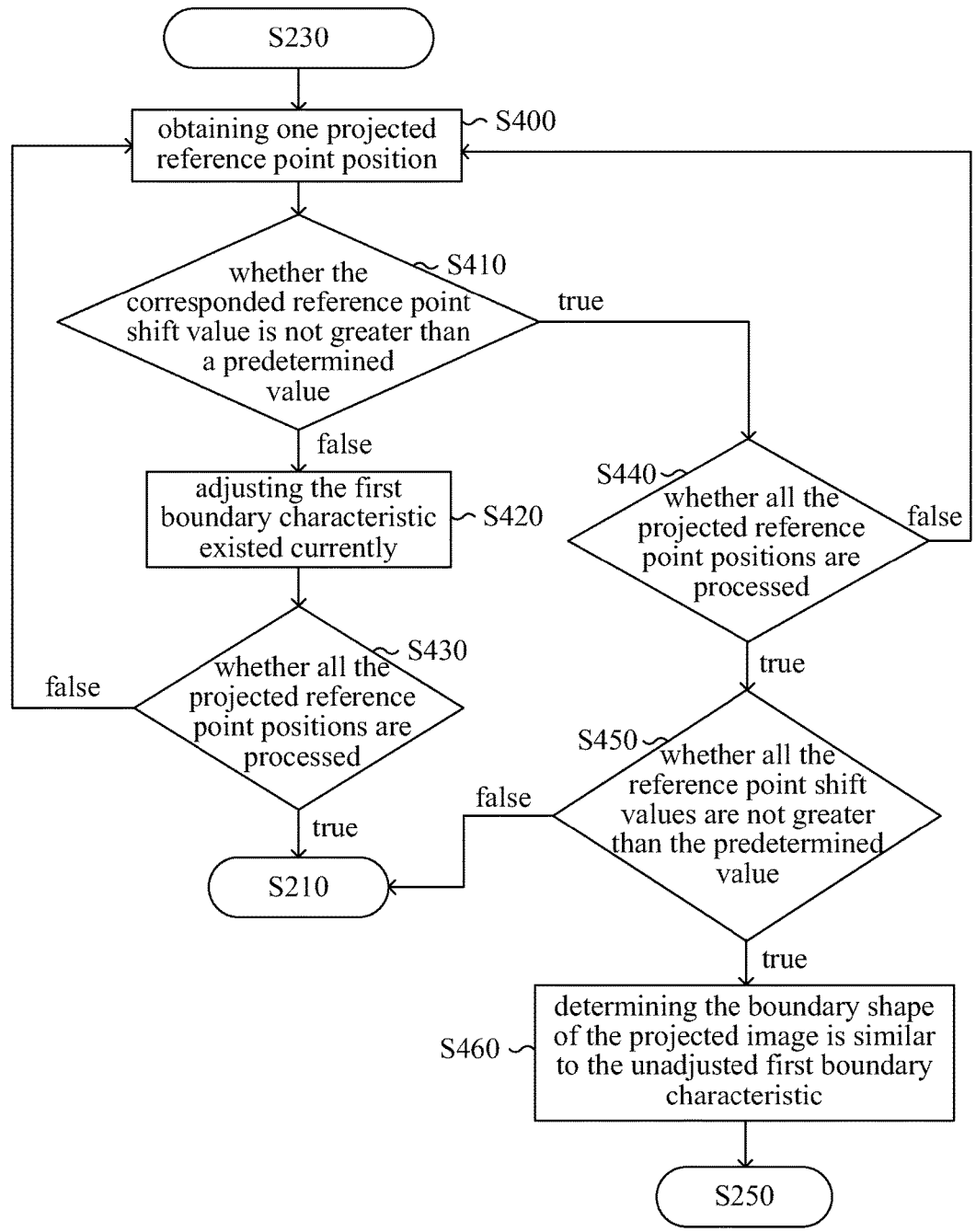
FIG. 4 is a detailed flow chart showing operations performed in the step S240 and the step S260 according to one embodiment of the present invention.

Please also refer to FIG. 4, which is a detailed flow chart showing operations performed in the step S240 and the step S260 according to one embodiment of the present invention. After the difference between the boundary shape of the projected image and the shape represented by the unadjusted first boundary characteristic is determined in the step S230 (or in the steps from S300 to S350), a projected reference point position estimated before is obtained in the step S400, and then the reference point shift value corresponding to the obtained projected reference point position is determined whether to be less than or equal to a predetermined value (step S410). When the reference point shift value is determined to be greater than the predetermined value in the step S410, the flow goes to the step S420 to adjust the first boundary characteristic existed currently. After adjusting the first boundary characteristic existed currently by the step S420, the step S430 determines whether all the projected reference point positions are processed. When the result of the determination in the step S430 is false, the flow goes back to the step S400 to obtain another projected reference point position not being processed yet and then begins to process on the obtained another projected reference point position. On the contrary, when the result of the determination in the step S430 is true, the flow goes to the step S210 and continues the operation described before.

In another aspect, when the result of the determination in the step S410 is that the reference point shift value is not greater than the predetermined value, the flow goes to the step S440 to determine whether all the projected reference point positions are processed. When the result of the determination in the step S440 is false, the flow goes back to the step S400 to obtain another projected reference point position not being processed yet and then begins to process on the obtained another projected reference point position. On the contrary, when the result of the determination in the step S440 is true, the flow goes to the step S450 to determine whether all the reference point shift values are not greater than the predetermined value. When the result of the determination in the step S450 is that all the reference point shift values are not greater than the predetermined value, the boundary shape of the projected image is determined to be similar to the unadjusted first boundary characteristic (step S460). Otherwise, when any one of the reference point shift values is greater than the predetermined value, the flow goes back to the step S210 to display the original image data with the newly adjusted first boundary characteristic.

Figure 5:
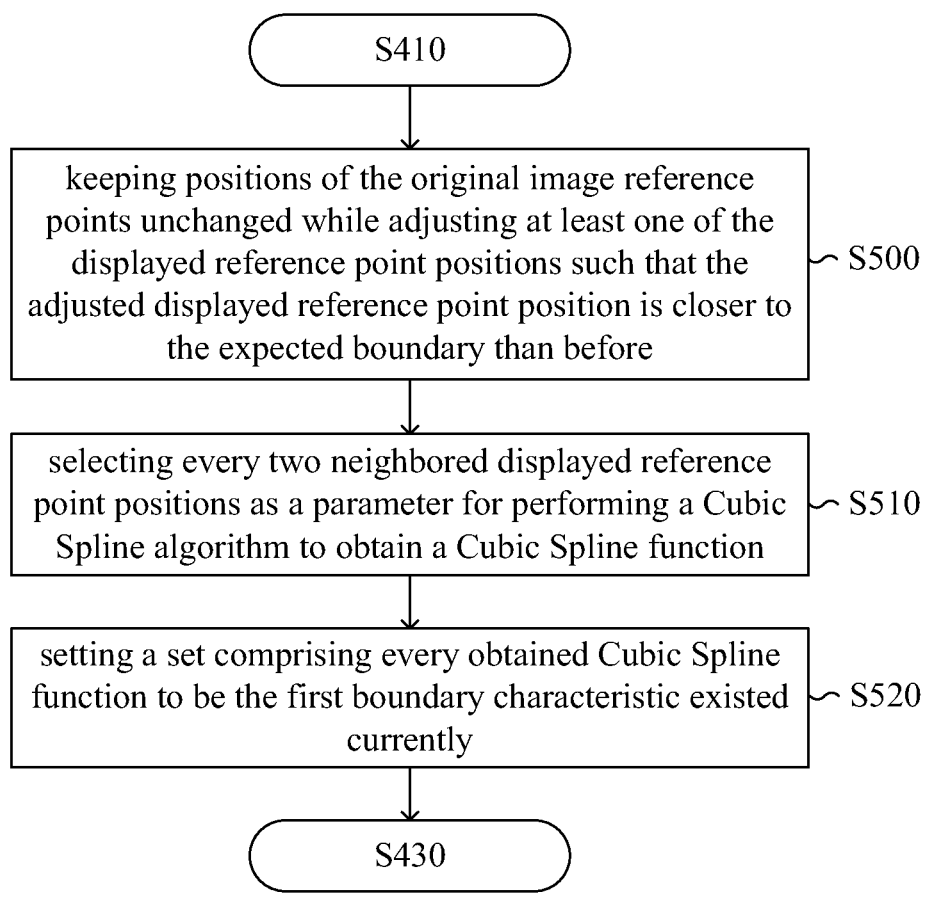
FIG. 5 is a detailed flow chart showing operations performed in the step S420 according to one embodiment of the present invention.

Please refer to FIG. 5, which is a detailed flow chart showing operations performed in the step S420 according to one embodiment of the present invention. In this embodiment, while adjusting the first boundary characteristic existed currently, the positions of the original image reference points are kept unchanged, and the displayed reference point position corresponding to one selected original image reference point currently under processing is adjusted such that the adjusted displayed reference point position is closer to the expected boundary than before (step S500). Then, the displayed reference point position corresponding to the selected original image reference point and the displayed reference point position corresponding to another one original image reference point next to the selected original image reference point are used as a parameter for performing a Cubic Spline algorithm to obtain a Cubic Spline function (step S510), wherein the two displayed reference point position used for performing the Cubic Spline algorithm are referred to as the two neighbored reference point positions, and the obtained Cubic Spline function represents a shape of a line connecting between the two neighbored displayed reference point positions. After the step S510, a set comprises every obtained Cubic Spline function is set to be the first boundary characteristic existed currently (step S520).

Because the boundary shape of the projected image is similar to the shape of the unadjusted first boundary characteristic through adjusting the first boundary characteristic, the second boundary characteristic obtained by performing the operations in the embodiments mentioned above can be used for projecting images thereafter. In other words, the boundary shape of a second projected image formed by projecting a second image generated by displaying the original image data with the second boundary characteristic should be similar to the shape of the unadjusted first boundary characteristic when other conditions remain unchanged. Therefore, the original image data can be displayed as the second image having the second boundary characteristic, and the boundary shape of the projected image obtained by projecting the second image would be one image being deformation-calibrated.

Figure 6:
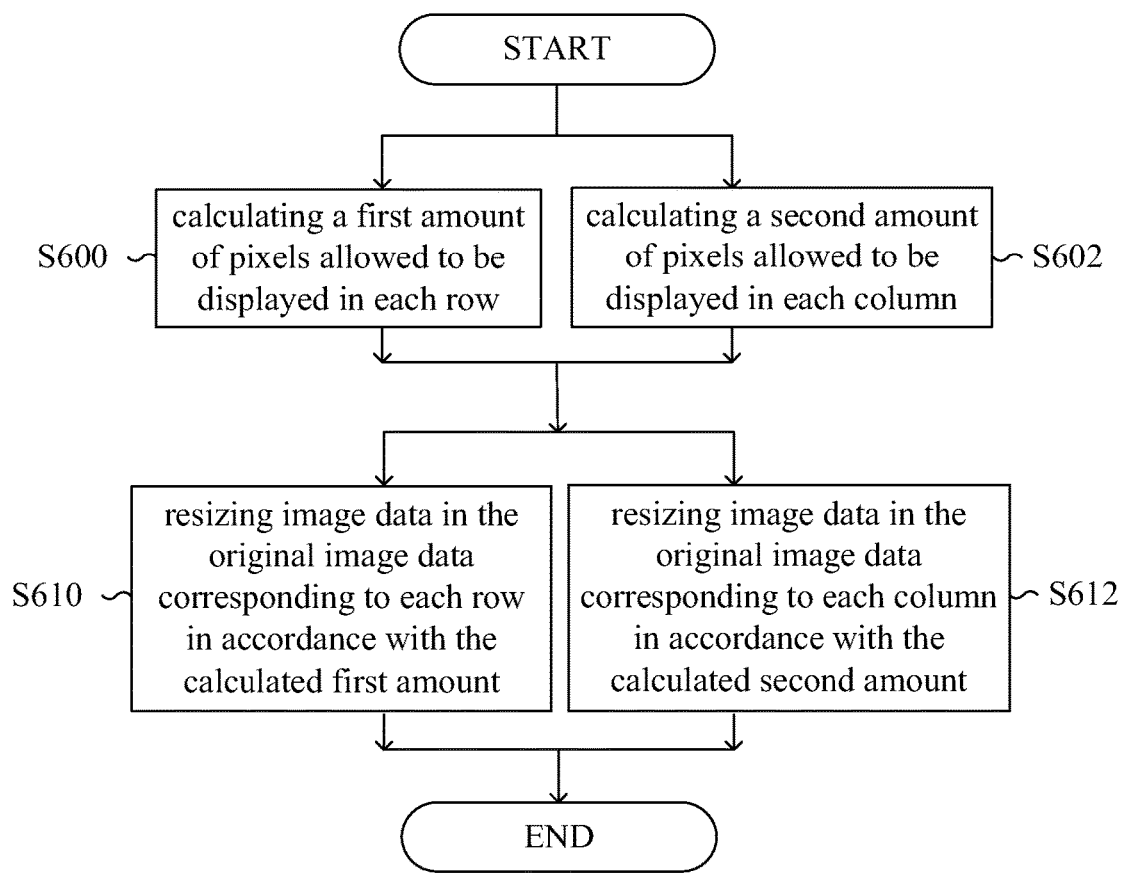
FIG. 6 is a flow chart showing steps of displaying the original image data as the second image having the second boundary characteristic according to one embodiment of the present invention.

It should be noted that, because the shape of the first boundary characteristic and the shape of the second boundary characteristic is different, the original image data should be adjusted properly while being displayed as the second image. Please refer to FIG. 6, which is a flow chart showing steps of displaying the original image data as the second image having the second boundary characteristic according to one embodiment of the present invention. As shown in FIG. 6, when the original image data is displayed as the second image having the second boundary characteristic in this embodiment, a first amount of pixels allowed to be displayed in each row between two displaying boundary lines which are opposite and extended along a first direction (such as x-axis) is calculated (step S600), and a second amount of pixels allowed to be displayed in each column between two displaying boundary lines which are opposite and extended along a second direction (such as y-axis) different from the first direction is calculated (step S602). Then, the image data in the original image data corresponding to each row between two displaying boundary lines which are opposite and extended along the first direction is resized in accordance with the calculated first amount (step S610), and the image data in the original image data corresponding to each column between two displaying boundary lines which are opposite and extended along the second direction is calculated in accordance with the calculated second amount (step S612).

Figure 7A:
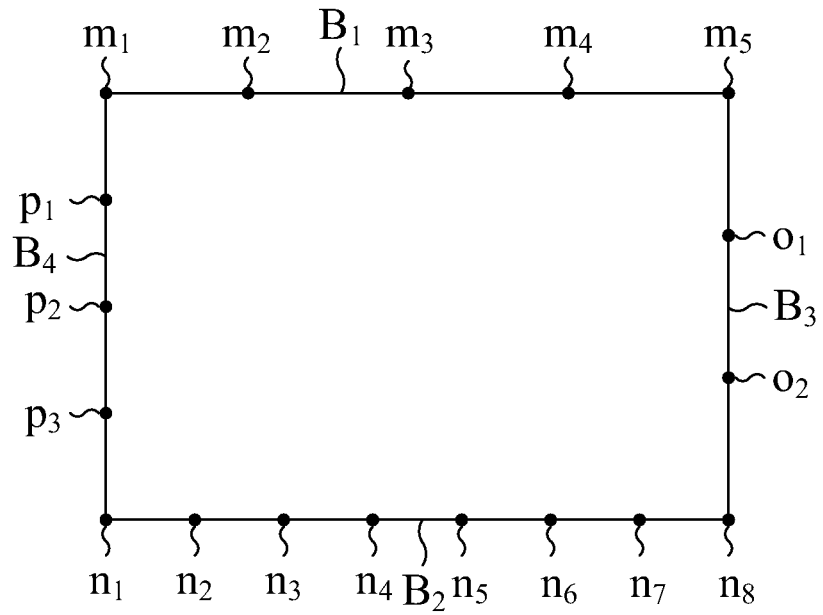
FIG. 7A is a schematic diagram showing the first image generated by displaying the original image data while using the unadjusted first boundary characteristic by the image calibration method according to one embodiment of the present invention.
Figure 7B:
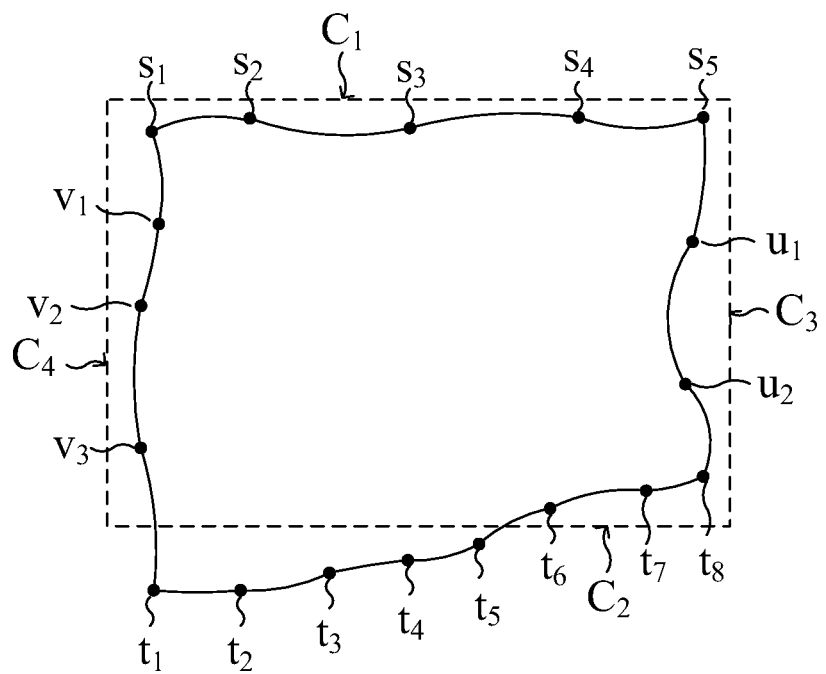
FIG. 7B is a schematic diagram showing the projected image generated by projecting the image in FIG. 7A.

An example below is provided to describe details of the operations made in FIG. 6. Please refer to FIG. 7A and FIG. 7B, wherein FIG. 7A is a schematic diagram showing the first image generated by displaying the original image data while using the unadjusted first boundary characteristic by the image calibration method according to one embodiment of the present invention, and FIG. 7B is a schematic diagram showing the projected image generated by projecting the image in FIG. 7A. In this embodiment, a boundary of the first image comprises four displaying boundary lines $B_1$, $B_2$, $B_3$ and $B_4$, and the four displaying boundary lines $B_1$, $B_2$, $B_3$ and $B_4$ are straight lines to form a quadrilateral. Assuming that the projected image generated by projecting the first image shown in FIG. 7A is the one shown in FIG. 7B, of which the four boundaries are deformed and with different shapes. Wherein, the four straight dotted lines $C_1$, $C_2$, $C_3$ and $C_4$ form the expected boundary line, and the area enclosed by the straight dotted line $C_1$, $C_2$, $C_3$ and $C_4$ is the expected projected image. It is observed that the boundary shape of the projected image is different from the shape of the expected boundary line, and therefore the contents in the projected image should also be deformed.

As shown in FIG. 7A, in this embodiment, five original image reference points are retrieved from the image data, which corresponds to the displaying boundary line $B_1$, in the original image, eight original image reference points are retrieved from the image data, which corresponds to the displaying boundary line $B_2$, in the original image, four original image reference points are retrieved from the image data, which corresponds to the displaying boundary line $B_3$, in the original image, and five original image reference points are retrieved from the image data, which corresponds to the displaying boundary line $B_5$, in the original image. It is noted that, the amount of the original image reference point retrieved from each displaying boundary line could be the same or not all the same, and are not limited to those described in this embodiment. Furthermore, it is preferred that the points located at the intersections of the four displaying boundary lines $B_1$, $B_2$, $B_3$ and $B_4$ are selected as a part of the original image reference points so that the amount of the calculation operation performed thereafter can be reduced. As shown in FIG. 7A, the positions of the retrieved original image reference points in the first image are the five displayed reference point positions $m_1$, $m_2$, $m_3$, $m_4$ and $m_5$ on the displaying boundary line $B_1$, the eight displayed reference point positions $n_1$, $n_2$, $n_3$, $n_4$, $n_5$, $n_6$, $n_7$ and $n_8$ on the displaying boundary line $B_2$, the four displayed reference point positions $m_5$, $o_1$, $o_2$ and $n_8$ on the displaying boundary line $B_3$, and the five displayed reference point positions $m_1$, $p_1$, $p_2$, $p_3$ and $n_1$ on the displaying boundary line $B_4$.

While projecting the first image to form the projected image, the displayed reference point positions $m_1$, $m_2$, $m_3$, $m_4$ and $m_5$ on the displaying boundary line $B_1$ would be projected to the corresponded projected reference point positions $s_1$, $s_2$, $s_3$, $s_4$ and $s_5$ respectively, the displayed reference point positions $n_1$, $n_2$, $n_3$, $n_4$, $n_5$, $n_6$, $n_7$ and $n_8$ on the displaying boundary line $B_2$ would be projected to the corresponded projected reference point positions $t_1$, $t_2$, $t_3$, $t_4$, $t_5$, $t_6$, $t_7$ and $t_8$ respectively, the displayed reference point positions $m_5$, $o_1$, $o_2$ and $n_8$ on the displaying boundary line $B_3$ would be projected to the corresponded projected reference point positions $s_5$, $u_1$, $u_2$ and $t_8$ respectively, and the displayed reference point positions $m_1$, $p_1$, $p_2$, $p_3$ and $n_1$ on the displaying boundary line $B_4$ would be projected to the corresponded projected reference point positions $s_1$, $v_1$, $v_2$, $v_3$ and $t_1$ respectively.

It is obvious that the boundary shape of the projected image and the boundary shape of the expected projected image is different. To solve this issue, the present embodiment adjusts the boundary shape of the projected image by way of adjusting the displayed reference point positions $m_1$~$m_5$, $n_1$~$n_8$, $o_1$, $o_2$ and $p_1$~$p_3$.

Figure 7C:
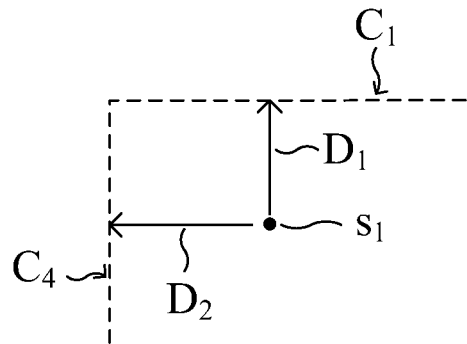
FIG. 7C is a schematic diagram showing the position relationship between the expected boundary and the projected reference point position $s_1$ shown in FIG. 7B.
Figure 7D:
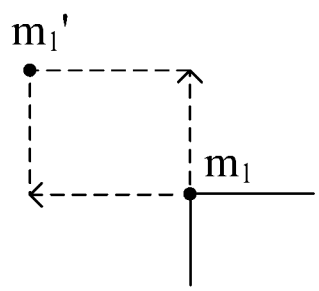
FIG. 7D is a schematic diagram showing adjustment operation made on the displayed reference point position $m_1$ while adjusting the projected reference point position $s_1$.

For example, please refer to FIG. 7C and FIG. 7D, wherein FIG. 7C is a schematic diagram showing the position relationship between the expected boundary and the projected reference point position $s_1$ shown in FIG. 7B, and FIG. 7D is a schematic diagram showing adjustment operation made on the displayed reference point position $m_1$ while adjusting the projected reference point position $s_1$. The distance $D_1$ is the reference point shift value while determining the difference between the projected reference point position $s_1$ and the expected boundary (specifically dotted line $C_1$), and the distance $D_2$ is the reference point shift value while determining the difference between the projected reference point position $s_1$ and the expected boundary (specifically dotted line $C_2$). Accordingly, it is preferred that, in this embodiment, the projected reference point position $s_1$ is moved in the direction extended to the upper-left corner in order to adjust the boundary shape of the projected image to be the shape of the expected projected image. Since the direction in which the position of the projected image changes is the same as the direction in which the position of the image source (first image in this embodiment) changes, and the distance variation is related to the ratio of scaling up or down, it is possible to move the displayed reference point position $m_1$ in the direction extended to the upper-left corner while trying to move the corresponded projected reference point position $s_1$ in the direction extended to the upper-left corner. For example, the displayed reference point position $m_1$ could be moved up for a first distance and moved left for a second distance so that it is move to the displayed reference point position $m_1'$.

Figure 7E:
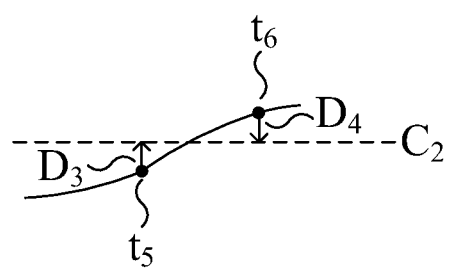
FIG. 7E is a schematic diagram showing the position relationship between the expected boundary and the projected reference point positions $t_5$ and $t_6$ shown in FIG. 7B.
Figure 7F:
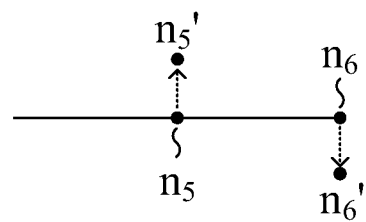
FIG. 7F is a schematic diagram showing adjustment operation made on the displayed reference point positions $n_5$ and $n_6$ while adjusting the projected reference point positions $t_5$ and $t_6$.

In another example, please refer to FIG. 7E and FIG. 7F, wherein FIG. 7E is a schematic diagram showing the position relationship between the expected boundary and the projected reference point positions $t_5$ and $t_6$ shown in FIG. 7B, and FIG. 7F is a schematic diagram showing adjustment operation made on the displayed reference point positions $n_5$ and $n_6$ while adjusting the projected reference point positions $t_5$ and $t_6$. The distance $D_3$ is the reference point shift value while determining the difference between the projected reference point position $t_5$ and the expected boundary (specifically dotted line $C_3$), and the distance $D_4$ is the reference point shift value while determining the difference between the projected reference point position $t_6$ and the expected boundary (specifically dotted line $C_3$). Accordingly, it is preferred that, in this embodiment, the projected reference point position $t_5$ is moved up and the projected reference point position $t_6$ is moved down in order to adjust the boundary shape of the projected image to be the shape of the expected projected image. Therefore, the displayed reference point position $n_5$ is moved up to the displayed reference point position $n_5'$ and the displayed reference point position $n_6$ is moved down to the displayed reference point position $n_6'$ so as to move the projected reference point positions $t_5$ and $t_6$ in the direction required as above.

Figure 7G:
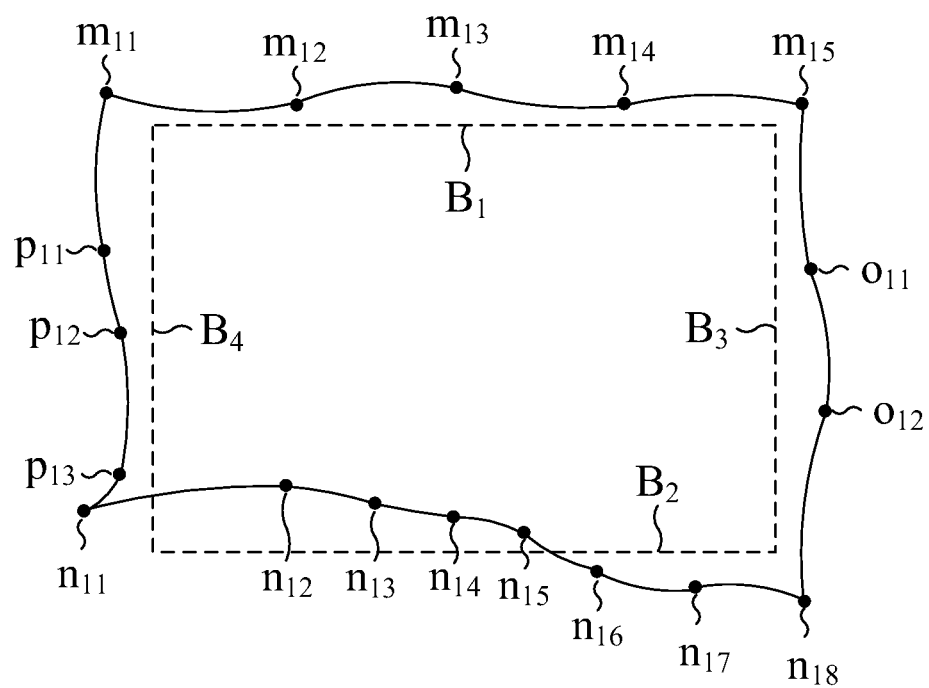
FIG. 7G is a schematic diagram showing the boundary shape of the first image shown in FIG. 7A after being calibrated.

Please refer to FIG. 7G, which is a schematic diagram showing the boundary shape of the first image shown in FIG. 7A after being calibrated. Wherein, the displayed reference point positions $m_1$~$m_5$, $n_1$~$n_8$, $o_1$, $o_2$ and $p_1$~$p_3$ are adjusted by using technique solutions similar to those provided through FIG. 7C~FIG. 7F, and therefore the corresponded new displayed reference point positions $m_{11}$~$m_{15}$, $n_{11}$~$n_{18}$, $o_{11}$, $o_{12}$ and $p_{11}$~$p_{13}$ are obtained. After obtaining the displayed reference point positions $m_{11}$~$m_{15}$, $n_{11}$~$n_{18}$, $o_{11}$, $o_{12}$ and $p_{11}$~$p_{13}$, the displayed point positions $m_{11}$, $m_{15}$, $n_{11}$ and $n_{18}$ are deemed four angular points of the first image having the adjusted first boundary characteristic because the displayed point positions $m_{11}$, $m_{15}$, $n_{11}$ and $n_{18}$ are the new positions of the four displayed point positions $m_1$, $m_5$, $n_1$ and $n_8$ respectively and the four displayed point positions $m_1$, $m_5$, $n_1$ and $n_8$ are the four angular points of the first image having the first boundary characteristic before adjusting. Moreover, every two neighbored displayed reference point positions, such as the displayed reference point positions $m_{11}$ and $m_{12}$, the display reference point positions $m_{12}$ and $m_{13}$, the displayed reference point positions $m_{11}$ and $p_{11}$, and the displayed reference point positions $p_{11}$ and $p_{12}$, are used as parameters for performing a Cubic Spline algorithm to obtain a Cubic Spline function between the selected two neighbored displayed reference point positions, and the set comprises all the obtained Cubic Spline functions are set as the first boundary characteristic existed currently, and the shape of the first boundary characteristic would be the shape formed by all the lines connecting the displayed reference point positions $m_{11}$~$m_{15}$, $n_{11}$~$n_{18}$, $o_{11}$, $o_{12}$ and $p_{11}$~$p_{13}$ as shown in FIG. 7G.

It is noted that not only can one boundary be processed at one time, but several boundaries also can be processed at the same time when the first boundary characteristic is adjusted.

Furthermore, after obtaining the adjusted first boundary characteristic by performing the operations described above, the flows shown in FIG. 4 can be used to determine whether the projected image generated accordingly meets the required shape or not. When the projected image does not meet the required shape, the first image having the adjusted first boundary characteristic can be adjusted again by the same method described above until the projected image meets the required shape. When the projected image meets the required shape, the adjusted displaying boundary line of the first image existed currently is recorded as the second boundary characteristic, and the recorded second boundary characteristic can be used for displaying any other original image data thereafter so that it is unnecessary for performing image calibration again.

It is noted that a simple method of recording the second boundary characteristic is to record the positions of all the pixels passed through by each displaying boundary line since not only can the shape represented by the second boundary characteristic be recorded fully and clearly, but the original image data to be displayed can also be resized directly according to the recorded data, which may use the method as provided in FIG. 6, wherein the displaying boundary passing through the displayed reference point positions $m_{11}$~$m_{15}$ and the displaying boundary passing through the display reference point positions $n_{11}$~$n_{18}$ are opposite and extended along the horizontal direction (or x-axis), and the displaying boundary passing through the displayed reference point positions $m_{11}$, $p_{11}$~$p_{13}$ and $n_{11}$ and the displaying boundary passing through the displayed reference point positions $m_{15}$, $o_{11}$, $o_{12}$ and $n_{18}$ are opposite and extended along the vertical direction (or y-axis).

Figure 8:
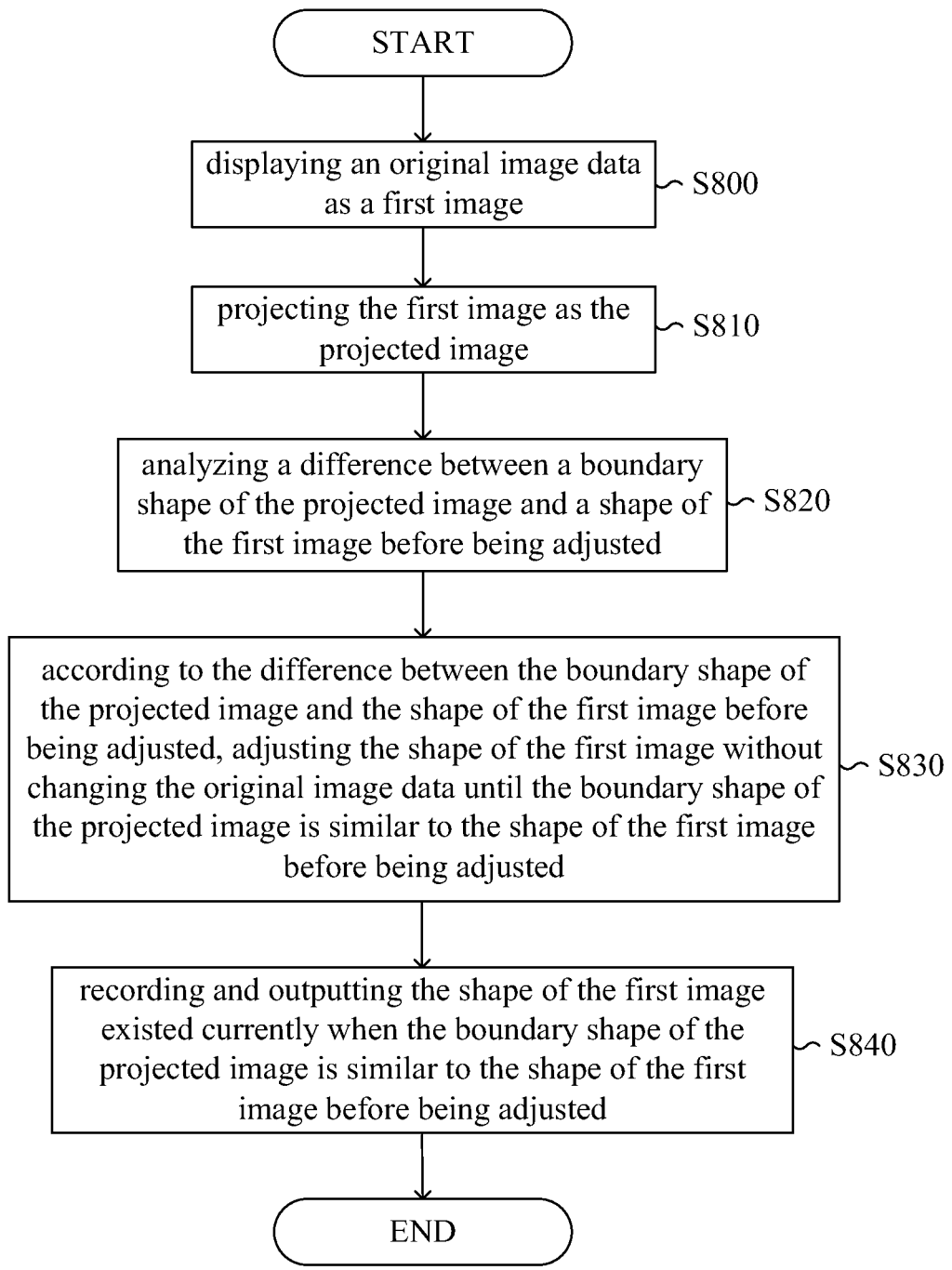
FIG. 8 is a flow chart showing the calibration method of projected image according to one embodiment of the present invention.

In another aspect of view, the calibration method of projected images can be summarized as the flow chart shown in FIG. 8. Please refer to FIG. 8, which is a flow chart showing the calibration method of projected image according to one embodiment of the present invention. In this embodiment, the original image data is displayed as a first image (step S800); the first image is projected as the projected image (step S810); a difference between a boundary shape of the projected image and a shape of the first image before being adjusted is analyzed (step S820); the shape of the first image is adjusted without changing the original image data according to the difference between the boundary shape of the projected image and the shape of the first image before being adjusted until the boundary shape of the projected image is similar to the shape of the first image before being adjusted (step S830); and the shape of the first image existed currently is recorded and output when the boundary shape of the projected image is similar to the shape of the first image before being adjusted (step S840).

Accordingly, the image projection system and calibration method of projected image calibrates deformation of the projected image by adjusting the image to be projected, so that the optical elements used for calibration deformation of the projected image are not needed. Therefore, the cost for calibrating images is reduced. Compared with the traditional technique which must adjust parameters of the optical elements used in the projection apparatus when characteristics of the medium where the image is projected (such as the curvature of a surface for projecting the image thereon), the image projection system and calibration method of projected image provided by the present invention can apply the same image calibration solution on the mediums with different characteristics easily to calibrate the deformation. Therefore, the technique solution provided by the present invention is very practical.

What is claimed is:

1. A calibration method of projected image, which is suitable for calibrating deformation of the projected image being projected by an image projection apparatus, comprising steps of:
    displaying an original image data as a first image having a first boundary characteristic;
    projecting the first image as the projected image by using the image projection apparatus;
    analyzing a difference between a boundary shape of the projected image and the first boundary characteristic which is unadjusted;
    adjusting the first boundary characteristic according to the difference between the boundary shape of the projected image and the unadjusted first boundary characteristic until the boundary shape of the projected image is similar to the unadjusted first boundary characteristic; and
    recording the first boundary characteristic as a second boundary characteristic when the boundary shape of the projected image is similar to the unadjusted first boundary characteristic,
    wherein the first boundary characteristic is the shape of at least one displaying boundary line around the first image,
    wherein the step of analyzing the difference between the boundary shape of the projected image and the first boundary characteristic which is unadjusted comprises steps of:
        retrieving at least two original image reference points from a boundary data displayed as the at least one displaying boundary line forming the first boundary characteristic, wherein the boundary data is included in the original image data;
        setting an expected boundary of an expected projected image to be similar to the unadjusted first boundary characteristic;
        for each of the at least two original image reference points, estimating a displayed reference point position where a corresponded one of the at least two original image reference points is displayed while displaying the original image data as the first image having the first boundary characteristic;
        for each of the at least two original image reference points, estimating a projected reference point position in the projected image according to the displayed reference point position, wherein the corresponded one original image reference point is projected onto the projected reference point position; and
        for each of the at least two original image reference points, estimating a distance between the projected reference point position and the expected boundary, and recording the distance as a reference point shift value corresponding to the projected reference point position;
    wherein the step of adjusting the first boundary characteristic according to the difference between the boundary shape of the projected image and the unadjusted first boundary characteristic until the boundary shape of the projected image is similar to the unadjusted first boundary characteristic comprises steps of:
        determining whether each of the reference point shift values is not greater than a predetermined value;
        when any one of the reference point shift values is greater than the predetermined value,
            adjusting the first boundary characteristic existed currently;
            displaying the original image data as the first image having the first boundary characteristic existed currently; and
            projecting the first image by the image projection apparatus to obtain the projected image; and
        determining the boundary shape of the projected image is similar to the unadjusted first boundary characteristic when each of the reference point shift values is not greater than the predetermined value;
    wherein the step of adjusting the first boundary characteristic which exists currently comprises steps of:
        keeping positions of the original image reference points unchanged while adjusting at least one of the displayed reference point positions such that the adjusted displayed reference point position is closer to the expected boundary than before;
        selecting every two neighbored displayed reference point positions as a parameter for performing a Cubic Spline algorithm to obtain a Cubic Spline function between the selected two neighbored displayed reference point positions; and setting a set comprising every obtained Cubic Spline function to be the first boundary characteristic existed currently.

2. The calibration method of claim 1, further comprising step of:

displaying the original image data as a second image having the second boundary characteristic.

3. The calibration method of claim 2, wherein the step of displaying the original image data as the second image having the second boundary characteristic comprises steps of:

calculating a first amount of pixels allowed to be displayed in each row between two displaying boundary lines which are opposite and extended along a first direction;

calculating a second amount of pixels allowed to be displayed in each column between two displaying boundary lines which are opposite and extended along a second direction different from the first direction;

resizing image data in the original image data corresponding to each row between two displaying boundary lines which are opposite and extended along the first direction in accordance with the calculated first amount; and resizing image data in the original image data corresponding to each column between two displaying boundary lines which are opposite and extended along the second direction in accordance with the calculated second amount.

4. The calibration method of claim 1, wherein a boundary of the first image comprises four displaying boundary lines, the four displaying boundary lines form a quadrilateral, and an amount of original image reference point in each of the four displaying boundary lines is not all the same.

* * * * *